US008631849B2

(12) United States Patent
Kai et al.

(10) Patent No.: US 8,631,849 B2
(45) Date of Patent: Jan. 21, 2014

(54) TRANSFER TOOL

(75) Inventors: Keiji Kai, Osaka (JP); Takashi Mitsui, Osaka (JP); Hideto Shima, Kyoto (JP)

(73) Assignee: Kokuyo Co., Ltd., Osaka-shi, Osaka (JP)

( * ) Notice: Subject to any disclaimer, the term of this patent is extended or adjusted under 35 U.S.C. 154(b) by 274 days.

(21) Appl. No.: 12/450,733

(22) PCT Filed: Jun. 5, 2008

(86) PCT No.: PCT/JP2008/060373

§ 371 (c)(1),
(2), (4) Date: Oct. 9, 2009

(87) PCT Pub. No.: WO2008/149936

PCT Pub. Date: Dec. 11, 2008

(65) Prior Publication Data

US 2010/0116440 A1 May 13, 2010

(30) Foreign Application Priority Data

Jun. 7, 2007 (JP) ................................ P2007-152167

(51) Int. Cl.

| | |
|---|---|
| ***E04D 15/00*** | (2006.01) |
| ***B29C 65/00*** | (2006.01) |
| ***B32B 38/10*** | (2006.01) |
| ***B65H 18/28*** | (2006.01) |
| ***B65D 85/02*** | (2006.01) |
| *B65H 23/06* | (2006.01) |
| *B05C 1/14* | (2006.01) |
| *B05C 11/00* | (2006.01) |

(52) U.S. Cl.

USPC ........... 156/577; 156/523; 156/579; 156/527; 156/540; 156/574; 242/160.4; 242/171; 242/588.6; 242/588.3; 118/257; 118/76

(58) Field of Classification Search

USPC ......... 156/577, 523, 579, 527, 538, 540, 574; 242/160.4, 171, 588.6, 588.3, 598.5, 242/598.6, 423, 423.1; 118/257, 76

See application file for complete search history.

(56) References Cited

U.S. PATENT DOCUMENTS

| | | | | | |
|---|---|---|---|---|---|
| 4,849,064 | A * | 7/1989 | Manusch et al. | .............. | 156/577 |
| 5,379,477 | A * | 1/1995 | Tamai et al. | ............... | 15/104.94 |
| 5,685,944 | A * | 11/1997 | Nose et al. | .................... | 156/540 |

(Continued)

FOREIGN PATENT DOCUMENTS

| | | | |
|---|---|---|---|
| EP | 1547808 | A2 * | 6/2005 |
| JP | 3069691 | | 3/2000 |

(Continued)

*Primary Examiner* — Philip Tucker
*Assistant Examiner* — Alex Efta
(74) *Attorney, Agent, or Firm* — McGinn IP Law Group, PLLC

(57) ABSTRACT

A transfer tool A in the present preferred embodiment is provided with a refill 3 including a reel section 31 for holding a transfer tape T therein, a transfer head 35 capable of transferring a transferring material attached to the transfer tape T onto a transfer target, and a support plate 34 having the reel section 31 fixed thereto and being integrated with a base end 351 of the transfer head 35, wherein a engaging section 5 capable of prohibiting a relative turn between the base end 351 and each of a first case member 1 and a second case member 2 is provided between the base end 351 and each of the first case member 1 and the second case member 2.

25 Claims, 12 Drawing Sheets

(56) References Cited

U.S. PATENT DOCUMENTS

| | | | | | |
|---|---|---|---|---|---|
| 5,770,007 | A | 6/1998 | Czech et al. | |
| 6,363,990 | B1 * | 4/2002 | Kozaki | 156/540 |
| 6,363,992 | B1 * | 4/2002 | Semmler | 156/577 |
| 6,418,997 | B1 * | 7/2002 | Tamai et al. | 156/577 |
| 6,702,491 | B2 * | 3/2004 | Kobayashi | 400/218 |
| 6,796,355 | B2 * | 9/2004 | Huthmacher et al. | 156/577 |
| 2004/0033353 | A1 * | 2/2004 | You | 428/343 |

FOREIGN PATENT DOCUMENTS

| | | | | |
|---|---|---|---|---|
| JP | 3069691 | U | * | 3/2000 |
| JP | 2000-211799 | | | 8/2000 |
| JP | 2000211799 | A | * | 8/2000 |
| JP | 2003-103993 | | | 4/2003 |
| JP | 2003103993 | A | * | 4/2003 |
| JP | 2006248183 | A | * | 9/2006 |
| WO | WO 01/62647 | A1 | | 8/2001 |

* cited by examiner

TRANSFER TOOL

TECHNICAL FIELD

The present invention relates to a transfer tool capable of favorably transferring a transferring material such as an adhesive or a correction ink coating film onto a transfer target such as paper.

BACKGROUND ART

In a transfer tool capable of favorably transferring a transferring material such as an adhesive or a correction ink coating film onto a transfer target such as paper, there have been conventionally proposed various kinds of transfer tools of a refill replacement type, in which the transfer tool can be used again by replacing only a refill contained inside of a case of the transfer tool with a new one after the transferring material is consumed.

In the transfer tool of a refill replacement type, a plurality of appropriately fixing means are disposed at a base end of a transfer head secured to the refill or a peripheral edge of the refill contained inside of the case in such a manner as to surround the peripheral edge of the refill inside of the case, to securely fix the refill inside of the case, thus favorably transferring the transferring material.

Patent Document 1: Japanese Utility Model Registration No. 3069691

DISCLOSURE OF THE INVENTION

Problems to be Solved by the Invention

However, action force for pressing the transfer head against the paper is required during a transfer operation in the transfer tool of a refill replacement type. Such action force is first exerted on the base end of the transfer head secured to the refill. Hence, force is generated at the base end of the transfer head serving as a fulcrum, and therefore, essential parts of the refill including a reel section may move inside of the case. As a consequence, the refill section must be supported enough to cope with the movement of the case during the transfer operation in the conventional transfer tool of a refill replacement type. For this reason and under such circumstances, the conventional transfer tool is forced to include numerous fixing points at the refill in abutment against the inside of the case.

At this time, the points at which the refill is secured to the case must be disposed while avoiding the reel section around which a transfer member is wound. Therefore, in the case where a plurality of fixing points are disposed at the peripheral edge of the refill so as to certainly secure the refill to the case, constituent elements of the refill must be disposed outside of the reel or a profile of the transfer member wound around the reel, thereby inducing a factor that the refill cannot be compactly constituted.

Otherwise, in the case where the refill inside of the case is short of support strength, a portion at which the reel section is turnably supported inside of the case is displaced from the reel section, thereby producing a trouble in rotation of the reel section. As a consequence, the wound transferring material is prevented from being supplied, that is, reeled out or wound up, thereby preventing the transferring material from being accurately transferred with ease.

Paying attention to this trouble, an object of the present invention is to provide a transfer tool capable of favorably transferring a transferring material while reducing portions at which a refill is supported inside of a case.

Means for Solving the Problems

In order to achieve the object, the present invention takes the following measures. Specifically, the present invention is directed to a transfer tool having a refill interposed between a first case member and a second case member, the refill including a reel section for holding a transfer tape therein, a transfer head capable of transferring a transferring material attached to the transfer tape onto a transfer target, and a support plate having the reel section fixed thereto and being integrated with a base end of the transfer head; wherein a engaging section capable of prohibiting a relative turn between the base end and the case member is provided between the base end and the case member.

The term "refill" is used herein to refer to a member which holds a transferring material and can be refilled and replaced. This term is synonymous with the wording "cartridge" or "replaceable cartridge," and therefore, they may be changed with each other.

This configuration can effectively avoid the trouble that since the acting force exerting during the transfer of the transferring material is transmitted onto the case member side via the engaging section, the refill contained between both of the case members is moved inside of both of the case members, and therefore, the reel section and the case member are moved relatively to each other. Therefore, it is possible to effectively reduce the number of other positioning portions for the both of the case members and the refill in the engaging section. As a consequence, it is possible to avoid the positioning portions from being disposed around the support plate, so as to achieve the compact refill having the compact support plate.

In order to securely support the refill by the case member, it is desirable that the engaging section should be disposed between the base end of the transfer head and each of the first and second case members.

As the engaging section capable of prohibiting the relative turn between the base end and the case member, it is desirable that the engaging section should include a recess formed at either one of the base end of the transfer head and the case member and a projection formed at the other.

The desirable shape of the recess and the projection is exemplified by forming each of the recess and the projection into a polygonal shape, as viewed in cross section. Here, the term "polygonal" includes, for example, shapes partly having indentations such as a cross and a star, in addition to a normal polygonal shape such as a regular triangle or square.

On the other hand, in order to effectively prevent any deviation between both of the case members during use by achieving the high engagement strength between both of the case members having the refill contained therebetween, it is desirable that the inner surface of each of the first case member and the second case member should abut against the base end.

Moreover, when the reel section includes a supply reel capable of supplying the transfer tape and a taking-up reel capable of taking up the transfer tape, either one of the case members supports the reel section at one end whereas the support plate supports the reel section at the other end. As a consequence, even if the support plate supports the reel section at either end, the reel section can be securely supported on both sides inside of the refill. In other words, even if the number of component parts constituting the refill is reduced by designing the support plate to support the reel section on only either side, the reel section can be favorably supported.

According to the present invention, as described above, in order to effectively prohibit the movement of the refill inside of the case members, either one of the case members includes a drive gear rotatable with the supply reel, so that the taking-up reel has a driven gear meshable with the drive gear formed thereon. As a consequence, the number of component parts responsible for the drive and the number of portions responsible for the rotation of the reel section can be effectively reduced, so as to achieve the stable traveling of the transfer tape.

Advantageous Results

According to the present invention, the relative movement between the reel section and the case member can be effectively avoided, so that the number of other positioning portions for both of the case members and the refill in the engaging section can be effectively reduced. As a consequence, it is unnecessary to provide any positioning portion around the support plate, so as to achieve the compact refill having the smaller support plate.

EXPLANATION OF REFERENCE NUMERALS

Figure 1:
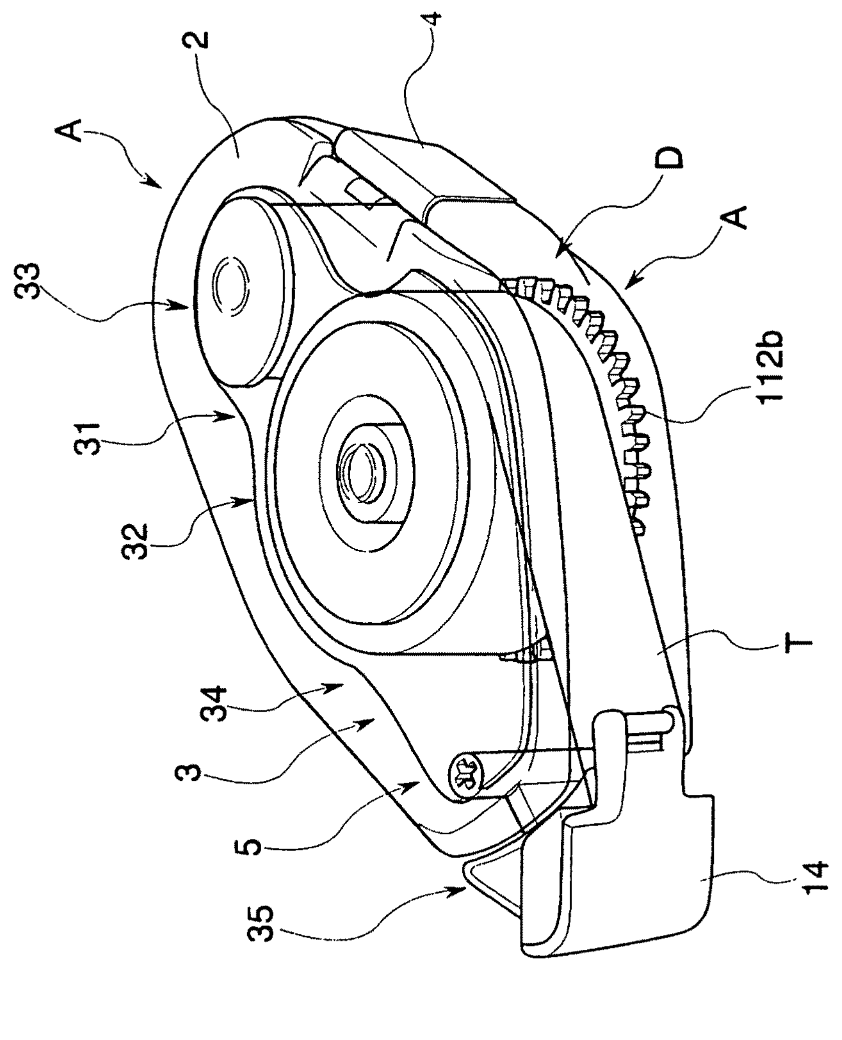
FIG. 1 is an external view illustrating a first preferred embodiment according to the present invention.
Figure 2:
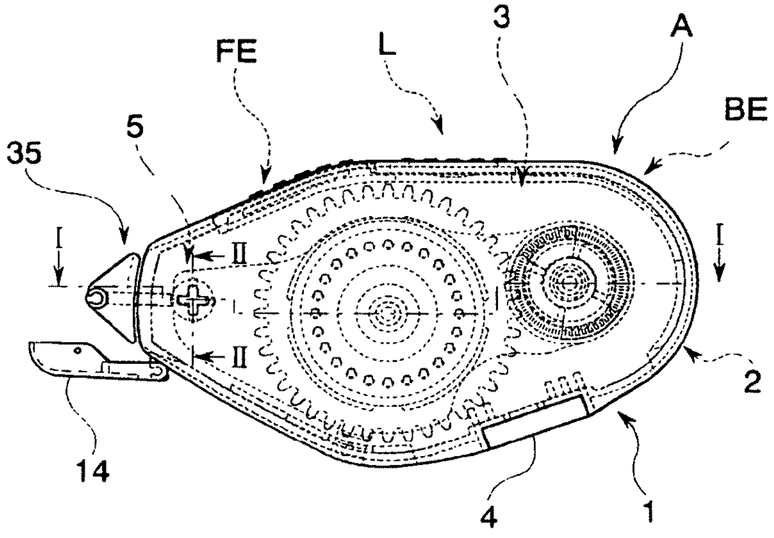
FIG. 2 is a plan view illustrating the preferred embodiment.
Figure 3:
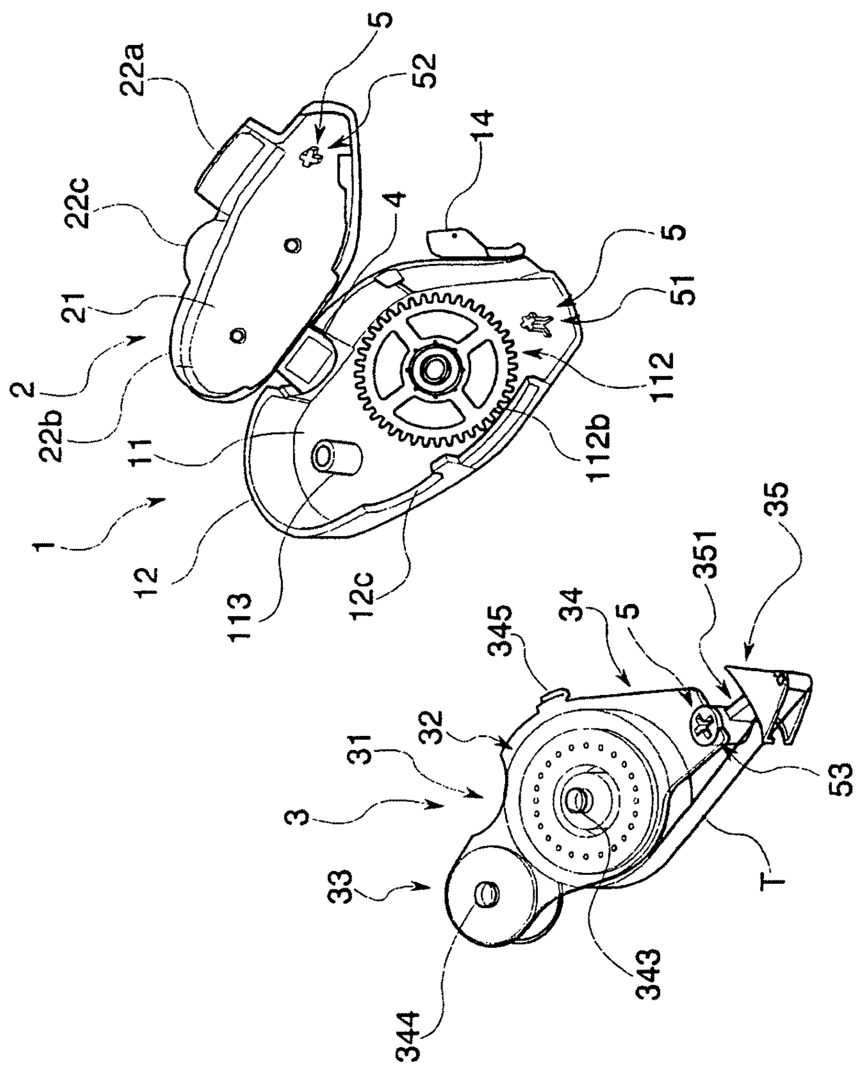
FIG. 3 is another external view illustrating the preferred embodiment.
Figure 4:
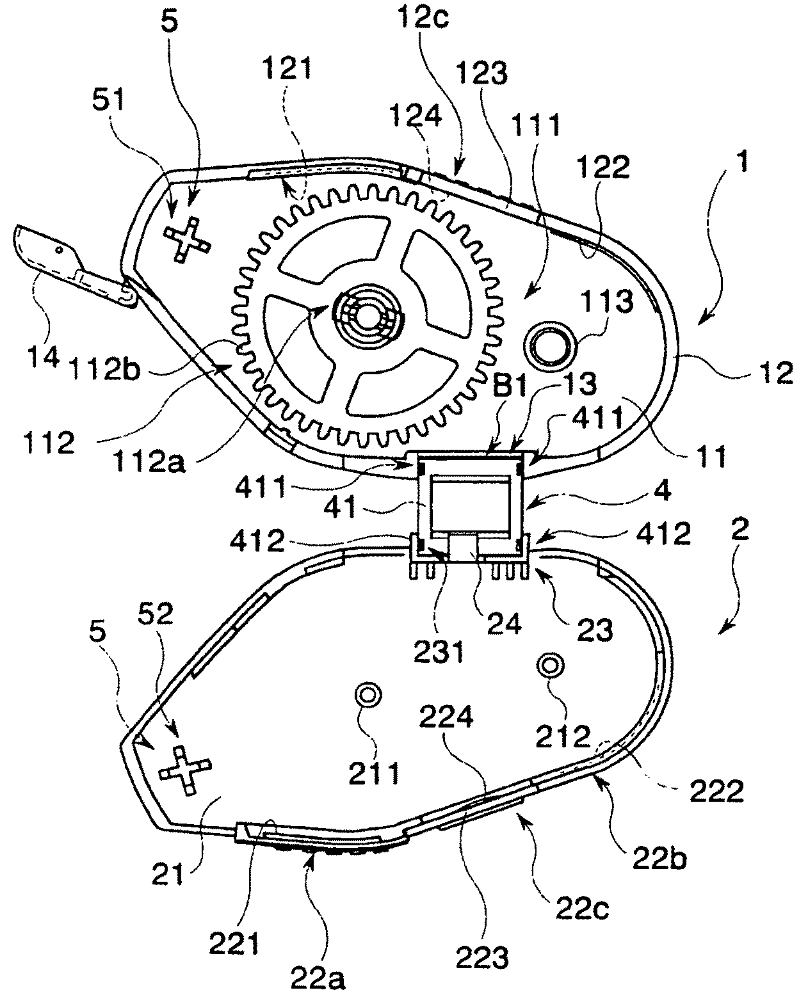
FIG. 4 is another plan view illustrating the preferred embodiment.
Figure 5:
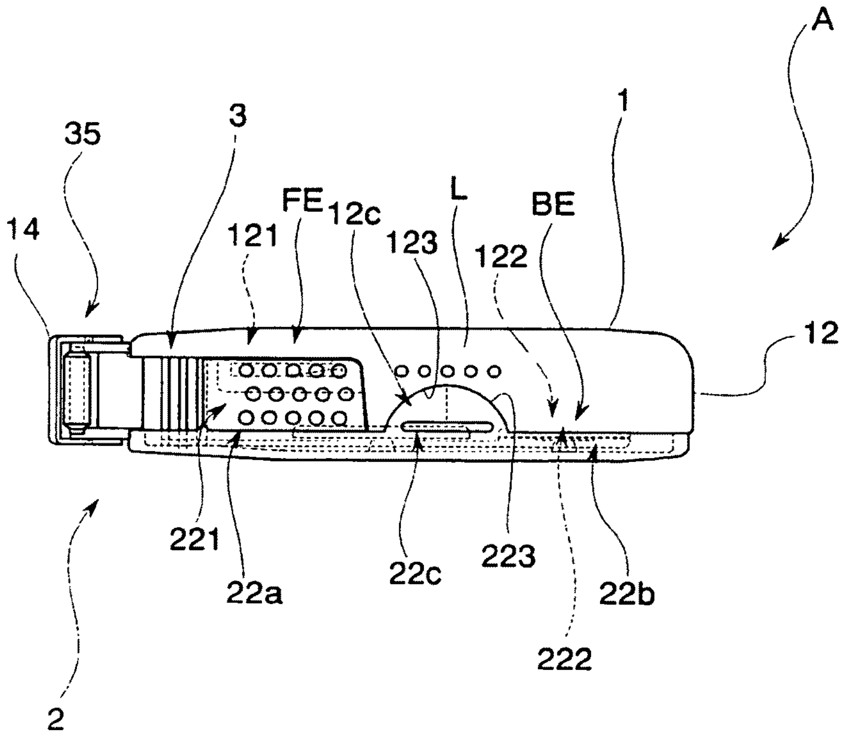
FIG. 5 is still another plan view illustrating the preferred embodiment.

1 . . . first case member
112*b* . . . drive gear
2 . . . second case member
3 . . . refill
31 . . . reel section
32 . . . supply reel
33 . . . taking-up reel
331*b* . . . driven gear
34 . . . support plate
35 . . . transfer head
351 . . . base end
5, 5A, 5B . . . engaging section
51*a*, 52*a*, 51*a*A, 52*a*A, 51*a*B, 52*a*B . . . projection
53*a*, 53*a*A, 53*a*B . . . recess
A . . . transfer tool
T . . . transfer tape

BEST MODE FOR CARRYING OUT THE INVENTION

A description will be given below of a preferred embodiment according to the present invention with reference to the attached drawings.

A transfer tool A in the present preferred embodiment includes mainly a first case member 1, a second case member 2 which can be engaged to the first case member 1, and a refill 3 which holds a transfer tape T and a transfer head 35 and is contained inside of the first case member 1 and the second case member 2 engaged to each other, as illustrated in FIGS. 1 to 5. Incidentally, the transfer tool A in the present preferred embodiment is exemplified by making the first case member 1, the second case member 2, and a support plate 34, described later, in the refill 3 of a transparent resin, and therefore, the inside of the first case member 1 and the second case member 2 is illustrated by solid lines in FIG. 1.

Moreover, the transfer tool A in the present preferred embodiment further includes a connecting member 4 for turnably connecting the first case member 1 and the second case member 2 to each other and a transmission mechanism D for transmitting rotation of a supply reel 32 constituting a reel section 31, described later, disposed between the first case member 1 and the refill 3 to a taking-up reel 33, as illustrated in FIGS. 1 to 5. The first case member 1 and the second case member 2 turnably connected to each other via the connecting member 4 constitute front engagement means FE, an operating section L, and back engagement means BE, described later, so as to achieve secure engagement and easy disengagement between the first case member 1 and the second case member 2.

Here, in the transfer tool A in the present preferred embodiment, the refill 3 includes the reel section 31 for holding the transfer tape T, the transfer head 35 capable of transferring a transferring material attached to the transfer tape T onto a transfer target, and the support plate 34 having the reel section 31 fixed thereto and a base end 351 of the transfer head 35 integrated therewith. Between the base end 351 and each of the first case member 1 and the second case member 2, there is provided a engaging section 5, described later, capable of prohibiting any relative turn between the base end 351 and each of the first case member 1 and the second case member 2.

Constituent elements of the transfer tool A will be explained below. In the explanation below, the term “front” indicates a side of the transfer head 35, unless particularly stated, whereas the term “back” indicates a side opposite to the transfer head 35, that is, from the transfer head 35 to the supply reel 32 and the taking-up reel 33. In addition, the transferring material may be an adhesive or a correction ink coating film for correcting characters or graphics written or printed on a sheet or a film serving as a transfer target.

As illustrated in FIGS. 1 to 5, the first case member 1 includes: a main wall 11 predominantly constituting the first case member 1; a side wall 12 formed integrally with the main wall 11 and surrounding the main wall 11; a first fixture 13 for turnably fixing the connecting member 4; and a head cover 14 fixed to the first case member 1 to freely cover the transfer head 35 during non-use. The head cover 14 has a normal structure which can take a posture capable of covering the transfer head 35 during the non-use at a position at which the transfer head 35 is exposed during use of the transfer tool A.

The head cover 14 may adopt various existing configurations, and therefore, specific explanation thereof will not be given below.

As illustrated in FIGS. 1 to 5, the main wall 11 includes a reel fixture 111 for rotatably fitting the reel section 31 therein. The reel fixture 111 specifically includes a supply reel fixture 112 for fitting the supply reel 32, described later, in the reel section 31 and a taking-up reel fixture 113 for rotatably supporting the taking-up reel 33. The supply reel fixture 112 includes a supply reel supporter 112*a* which is inserted into an meshing hole 321*a*, described later, formed in the supply reel 32 so as to be rotated together with the supply reel 32; and a drive gear 112*b* disposed coaxially with the supply reel supporter 112*a* via a slide mechanism, not illustrated. The taking-up reel fixture 113 is formed integrally with the main wall 11 in a substantially cylindrical shape. Moreover, the taking-up reel fixture 113 is designed to be inserted into a taking-up reel fitting hole 331*a*, described later, formed at a tip of the taking-up reel 33. A lower front portion of the main wall 11 serves as an open end at which no side wall 12 is formed. The transfer head 35, described later, can project from the open end.

The main wall 11 includes a first cross rib 51 constituting the engaging section 5, described later, formed at a position corresponding to the base end 351 of the transfer head 35, described later. The configuration of the first cross rib 51 will be described later.

As illustrated in FIGS. 1 to 5, the side wall 12 includes a front groove 121 constituting the front engagement means FE, a rear projection 122 constituting the rear engagement means BE, and a claw receiver 12*c* constituting the operating section L in cooperation with a claw 22*c*, described later. The front groove 121 is formed at the outer surface of the front portion of the side wall 12, to engage with a front projection 221, described later, formed at the second case member 2, thereby constituting the front engagement means FE in cooperation with the front projection 221. The rear projection 122 is formed at the inner surface of the back portion of the side wall 12, to be engaged into a back groove 222, described later, formed at the second case member 2, thereby constituting the back engagement means BE in cooperation with the back groove 222. The claw receiver 12*c* is formed at an intermediate position between the front groove 121 and the back groove 222 on the side wall 12. The claw receiver 12*c* includes a cutout 123 and a claw receiving recess 124. The cutout 123 is formed by cutting out the side wall 12 in a semicircular shape, to correspond to an operating end 223, described later. The claw receiving recess 124 is formed nearer the main wall 11 than the cutout 123, and engages with an engagement end 224, described later, of the claw 22*c* in the second case member 2. The first fixture 13 is provided with a fixing recess 131 having a depth substantially equal to the thickness of the connecting member 4. A projection functioning as an axis of the connecting member 4 on the first case member 1 side is formed on each of the front and rear inner wall of the fixing recess 131.

As illustrated in FIGS. 1 to 5, the second case member 2 includes a cover wall 21 substantially covering the first case member 1; a first side wall 22*a* and a second side wall 22*b* formed integrally with the cover wall 21 to overlap the side wall 12 of the first case member 1; the claw 22*c* interposed between the first side wall 22*a* and the second side wall 22*b*, thereby constituting the operating section L engageable with the claw receiver 12*c* in the first case member 1 by elastic deformation; a second fixture 23 for fixing the connecting member 4; and a rotation restricting piece 24 for restricting the rotation of the connecting member 4.

The cover wall 21 has insertion projections 211 and 212 which can be fitted into holes 343 and 344 to be supported, formed at the support plate 34 at two points corresponding to the respective centers of the supply reel 32 and the taking-up reel 33.

In addition, the cover wall 21 has a second cross rib 52 constituting the engaging section 5, formed at a position corresponding to the base end 351, described later, of the transfer head 35. The configuration of the second cross rib 52 will be described later.

The first side wall 22*a* has the front projection 221 formed at the inner surface thereof. The front projection 221 can be engaged into the front groove 121 formed at the first case member 1, and constitutes the front engagement means FE in cooperation with the front groove 121. The second side wall 22*b* has the back groove 222 formed at the outer surface thereof. The back groove 222 can engage with the back projection 122 formed on the first case member 1 side, and constitutes the back engagement means BE in cooperation with the back projection 122. The claw 22*c* is provided with the engagement end 224 actually engaging with the claw receiving recess 124 and the operating end 223 receiving external force for disengaging the engagement end 224 in engagement with the claw receiving recess 124. The operating end 223 has a substantially semicircular plane in conformity with the cutout 123. Like the first fixture 13, the second fixture 23 has a fixing recess 231 having a depth substantially equal to the thickness of the connecting member 4. Likewise, a projection functioning as an axis on the second case member 2 side of the connecting member 4 is formed on front and back inner walls of the fixing recess 231. The rotation restricting piece 24 is disposed across the second fixture 23. The rotation restricting piece 24 restricts the rotation of the second case member 2 when the second case member 2 is rotated in a direction in which the second case member 2 is closed from a state in which the second case member 2 is opened at an angle of more than 90° apart from the connecting member 4.

As illustrated in FIGS. 1 to 5, the connecting member 4 functions as a hinge for rotatably connecting the first case member 1 and the second case member 2 independently of each other so as to allow the first case member 1 and the second case member 2 to serve as a casing in cooperation with each other. The connecting member 4 is made of a soft or elastic synthetic resin material. The connecting member 4 is provided with a substantially rectangular plate-like hinge body 41 functioning as the hinge and first and second rotary pins 411 and 412 disposed along long sides of the rectangle. For detailed explanation, the hinge body 41 has the center of an upper surface recessed more than a step around the center. The formation of the step achieves a structure of the first and second rotary pins 411 and 412. The first rotary pin 411 has holes formed at both ends thereof, and thus, the holes engage with the projection of the first fixture 13 in the first case member 1. On the other hand, the second rotary pin 412 has holes formed at both ends thereof, and thus, the holes engage with the projection of the second fixture 23 in the second case member 2.

The connecting member 4 connects the first case member 1 and the second case member 2 in a rotatable manner relative to each other. During the use, the rotation restricting piece 24 is moved at and brought into contact with the surface defined between the first rotary pin 411 and the second rotary pin 412 in the hinge body 41. The contact of the rotation restricting piece 24 with the first rotary pin 411 achieves the turn of the second case member 2. That is to say, when the first case member 1 and the second case member 2 are opened, the first case member 14 and the second case member 2 can become flush with each other, and therefore, the refill 3 can be readily replaced with a new one.

As illustrated in FIGS. 1 to 3 and 6 to 10, the refill 3 is held between the first case member 1 and the second case member 2. The refill 3 essentially includes the reel section 31 for winding up and holding the transfer tape T, the transfer head 35 capable of pressing the transfer tape T against the transfer target such as the paper, and the support plate 34 for rotatably supporting the reel section 31 and integrally holding the transfer head 35.

Figure 6:
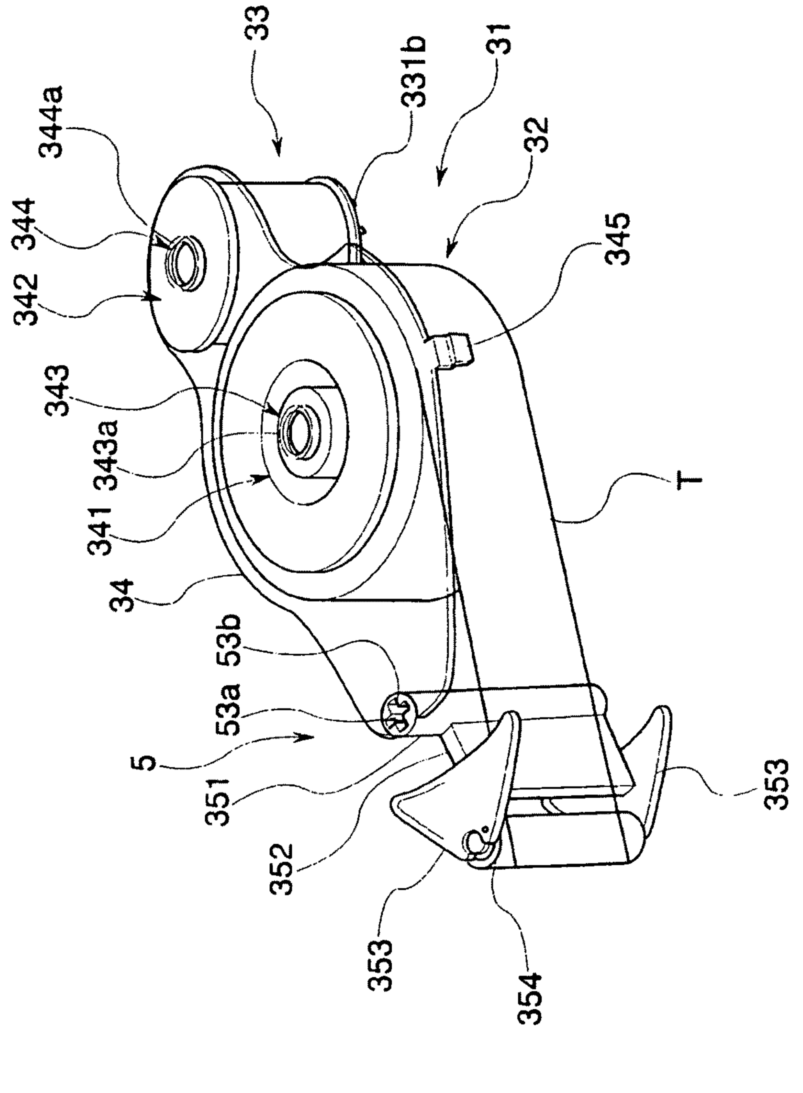
FIG. 6 is still another external view illustrating the preferred embodiment.
Figure 7:
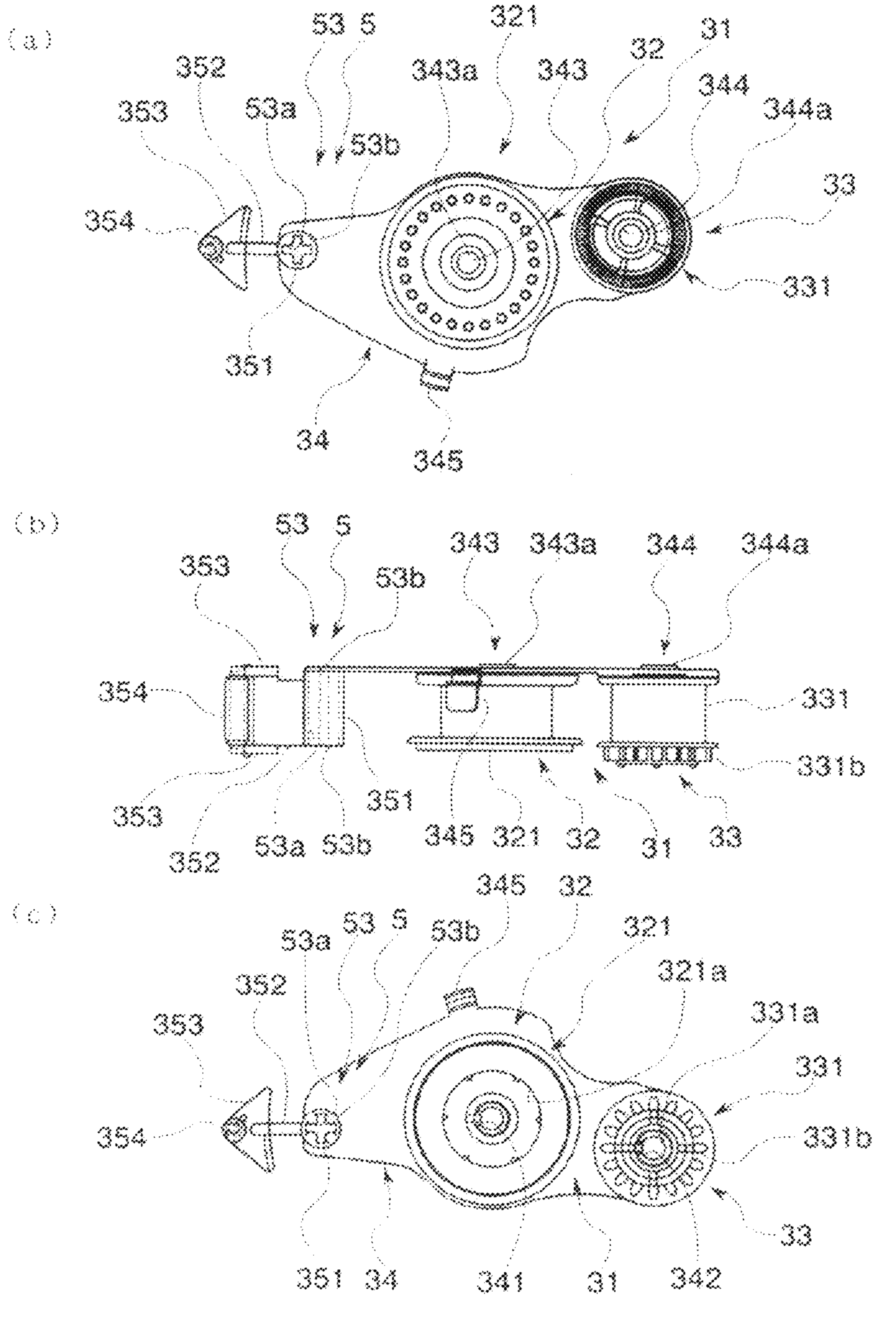
FIGS. 7(*a*) to 7(*c*) are yet another plan views illustrating the preferred embodiment.
Figure 8:
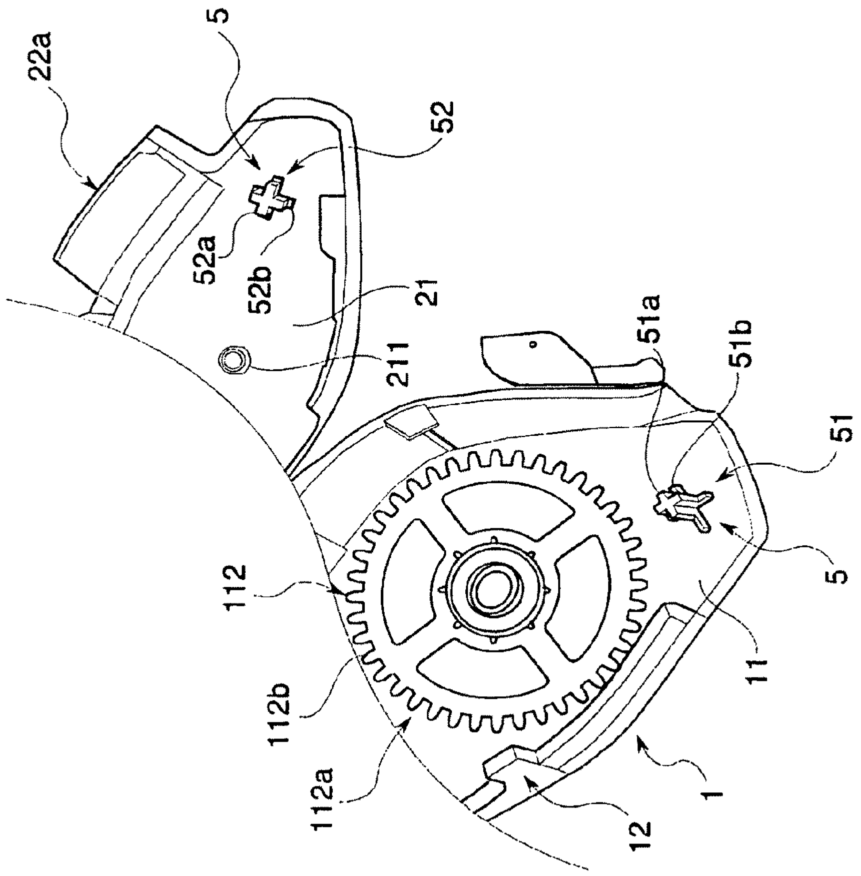
FIG. 8 is an external view illustrating essential parts in the preferred embodiment.

As particularly illustrated in FIGS. 6, 7(*a*), 7(*b*), and 7(*c*) the reel section 31 has the supply reel 32 around which a virgin transfer tape T is wound and the taking-up reel 33 for taking up the film of the used transfer tape T.

The supply reel 32 includes a supply reel body 321 serving as a main body of the supply reel 32 and an meshing hole 321*a* which can contain the transfer tape T while meshing with the supply reel supporter 112*a* so as to transmit the rotation of the supply reel 32 to the supporter 112*a* when the transfer tape T is taken out, as illustrated in FIGS. 6, 7(*a*), 7(*b*), and 7(*c*).

The taking-up reel 33 includes a taking-up reel body 331 serving as a main body of the taking-up reel 33, a taking-up reel fixing hole 331*a* which can contain the taking-up reel fixture 113 in such a manner as to be rotated with respect to the taking-up reel fixture 113, and a driven gear 331*b* which is formed at the peripheral edge of the taking-up reel fixing hole 331*a* so as to mesh with the drive gear 112*b*, as illustrated in FIGS. 6, 7(*a*), 7(*b*), and 7(*c*). In other words, in the present preferred embodiment, the supply reel supporter 112*a* and the drive gear 112*b*, which constitute the supply reel fixture 112, and the driven gear 331*b* configure the transmission mechanism D.

As illustrated in FIGS. 6, 7(*a*), 7(*b*), and 7(*c*), the base end 351 of the transfer head 35 is positioned at a fore end of the support plate 34. The support plate 34 includes: a supply reel holder 341 and a taking-up reel holder 342 which rotatably hold the supply reel 32 and the taking-up reel 33, respectively, at a surface facing the first case member 1; holes 343 and 344 to be supported which are formed at portions corresponding to the respective centers of the supply reel 32 and the taking-up reel 33 at a surface facing the second case member 2; and a protecting piece 345 capable of avoiding a package member from erroneously attached to the transferring material at the lower end of the support plate 34 during transportation of only a refill 3. Moreover, abutment ends 343*a* and 344*a* which abut against the second case member 2 so as to position the support plate 34 in a thickness direction are formed at open edges of the holes 343 and 344 to be supported. The protecting piece 345 abuts against the side wall 12 at the lower end of the first case member 1 when the refill 3 is contained between the first case member 1 and the second case member 2.

As illustrated in FIGS. 6, 7(*a*), 7(*b*), and 7(*c*), the transfer head 35 includes the base end 351 formed integrally with the support plate 34, an extension 352 extending forward of the base end 351, restrictions 353 formed on both sides of the extension 352, and a transfer roller 354 rotatably supported at the tips of the restrictions 353. The base end 351 has a cross hole 53 constituting the engaging section 5, described later. The cross hole 53 will be described later. The extension 352 is designed to be slightly elastically deformed when the transfer head 35 is used under pressure in the present preferred embodiment. The restrictions 353 are adapted to suppress any sideway deviation of the transfer tape T during the use, so as to allow the transfer tape T to stably travel and the transferring material to be accurately transferred onto the transfer target. The surface of the transfer roller 354 is made of, for example, an elastically deformable material, so that the transfer tape T is favorably pressed against the transfer target.

In this manner, the transfer tool A in the present preferred embodiment is featured in that the engaging section 5 capable of prohibiting the relative turn between the base end 351 and the case members is disposed between the base end 351 of the transfer head 35 and the first and second case members 1 and 2, as illustrated in FIGS. 1 to 10. Specifically, the engaging section 5 is disposed between the base end 351 of the transfer head 35 and each of the first and second case members 1 and 2. The configuration of the engaging section 5 will be explained below.

As illustrated in FIGS. 6 to 11, the engaging section 5 includes the first cross rib 51 formed at the first case member 1, the second cross rib 52 formed at the second case member 2, and the cross hole 53 formed at the base end 351 of the transfer head 35.

As illustrated in FIGS. 6 to 11, the first cross rib 51 is erected from the main wall 11 of the first case member 1, and includes a projection 51*a* freely fitted into a recess 53*a* of the cross hole 53 and an abutment surface 51*b* formed by raising the main wall 11, that is, the inner surface of the first case member 1 at the peripheral edge of the recess 53*a*. The projection 51*a* is formed into a cross shape that is a polygonal shape as viewed in cross section, in the present preferred embodiment, to be fitted into the recess 53*a* without any clearance. The abutment surface 51*b* can abut against the end surface 53*b* formed at the cross hole 53 when the first member 1 and the second case member 2, that is, the front engagement means FE, the back engagement means BE, and the operating unit L engage with each other.

As illustrated in FIGS. 6 to 11, the second cross rib 52 is erected from the cover wall 21 of the second case member 2, and includes a projection 52*a* freely fitted into the recess 53*a* of the cross hole 53 and an abutment surface 52*b* formed by raising the cover wall 21, that is, the inner surface of the second case member 2 at the peripheral edge of the projection 52*a*. The projection 52*a* is formed into a cross shape that is a polygonal shape as viewed in cross section, in the present preferred embodiment, to be fitted into the recess 53*a* without any clearance. The abutment surface 52*b* can abut against the end surface 53*b* formed at the cross hole 53 when the first case member 1 and the second case member 2, that is, the front engagement means FE, the back engagement means BE, and the operating unit L engage with each other.

As illustrated in FIGS. 6 to 11, the cross hole 53 includes the recess 53*a* which can be fitted to the projections 51*a* and 52*a* at the inner surface without any clearance and end surfaces 53*b* facing the inner surfaces of the first case member 1 and the second case member 2, respectively. The recess 53*a* is formed into a cross shape that is a polygonal shape as viewed in cross section, in such a manner as to correspond to the projections 51*a* and 52*a* in the present preferred embodiment, to be fitted around the projections 51*a* and 52*a* without any clearance.

Figure 9:
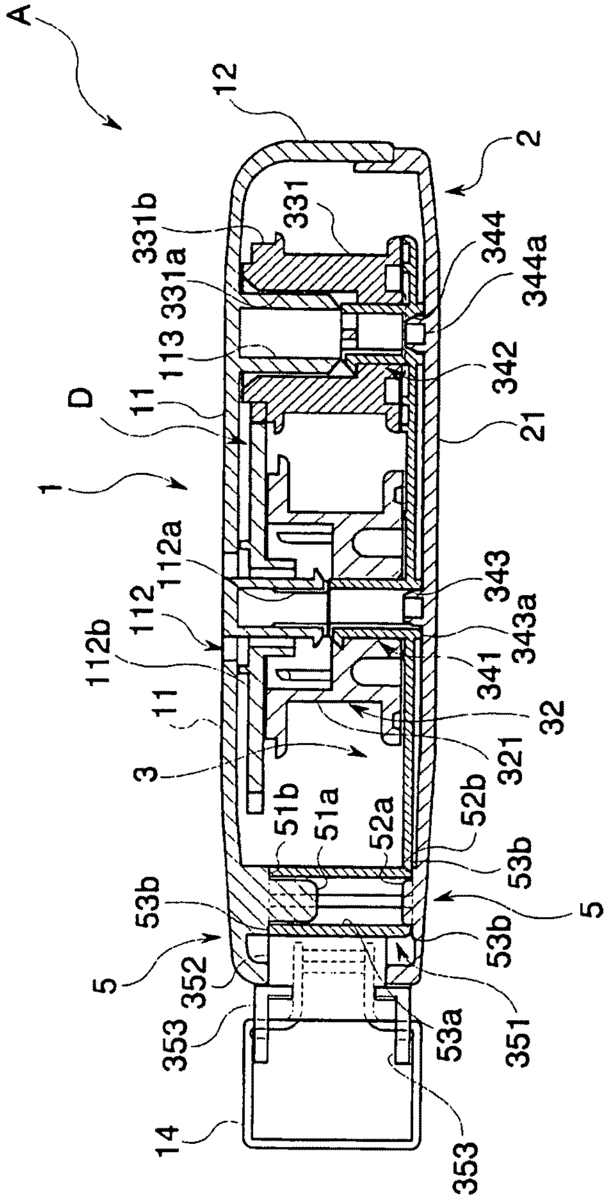
FIG. 9 is a cross-sectional view taken along line I-I in FIG. 2.
Figure 10:
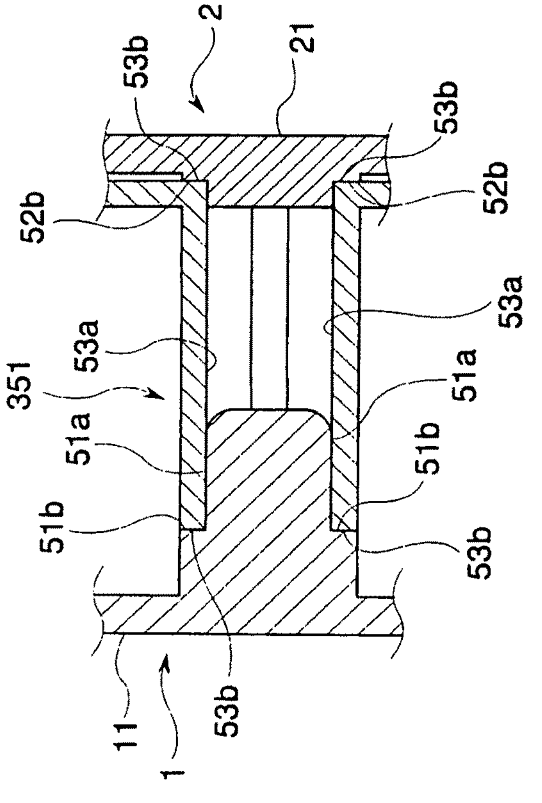
FIG. 10 is a cross-sectional view taken along line II-II in FIG. 2.

As illustrated in cross section in FIGS. 9 and 10, when the refill 3 is contained between the first case member 1 and the second case member 2, the projections 51*a* and 52*a* are fitted into the recess 53*a* without any clearance, so that the base end 351 of the transfer head 35 cannot be rotated with respect to the first case member 1 or the second case member 2. In this state, the abutment surface abuts at both ends of the end surface 53*b* of the cross hole 53, to be positioned in the thickness direction. In particular, the abutment surface presses the end surface 53*b* of the cross hole 53 on both sides while being elastically urged by the elasticity of the first case member 1 and the second case member 2 which are made of a resin. In this state, the insertion projections 211 and 212 formed at the second case member 2 are inserted into the holes 343 and 344 to be supported, formed at the support plate 34, and further, the abutment ends 343*a* and 344*a* of the holes 343 and 344 to be supported abut against the cover wall 21, so that the support plate 34 can be accurately positioned in the thickness direction. Additionally, in this state, the first case member 1 and the second case member 2 engage with each other with enhanced strength against the elasticity via the cross hole 53 formed at the base end 351 of the transfer head 35 interposed therebetween.

Figure 11:
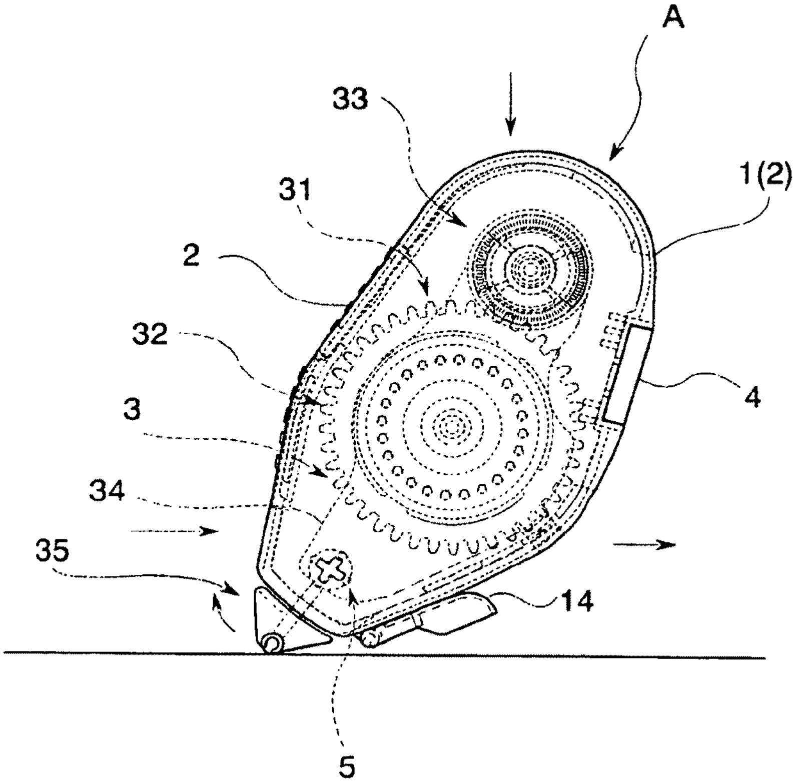
FIG. 11 is a view illustrating a function in the preferred embodiment.

As illustrated in FIG. 11, when the transfer head 35 is pressed against the transfer target, the engaging section 5 prohibits the relative rotation between the base end 351 and the first and second case members 1 and 2. As a consequence, acting force generated during the transfer of the transferring material is transmitted onto the case member side via the engaging section 5, and therefore, even if pressing the transfer head 35 produces acting force in a direction in which the transfer head 35 is turned relatively upward on the base end 351, the support plate 34 cannot be turned inside of the first and second case members 1 and 2. In this manner, no acting force exerts on the contact portion between the reel section 31 and the first case member 1. Specifically, only the prohibition of the turn by the engaging section 5 can securely prohibit the vertical movement of the refill 3 inside of both of the case members. It is possible to effectively avoid the trouble that the refill 3 contained between both of the case members is accidentally moved inside of both of the case members, and therefore, the reel section 31 and the case members are moved relative to each other.

With the above-described configuration, the transfer tool A in the present preferred embodiment can transmit the acting force exerting during the transfer of the transferring material, as described above, onto the first case member 1 or the second case member 2 via the engaging section 5 since the engaging section 5 capable of prohibiting the relative turn between the base end 351 and the first and second case members 1 and 2 is disposed between the base end 351 and the first and second case members 1 and 2. As a consequence, it is possible to effectively avoid the trouble that the movement of the refill 3 contained between the first case member 1 and second case member 2 induces the deviation of the reel section 31 from the first case member 1 and the second case member 2. This can effectively reduce the number of other portions where the refill 3 is positioned, other than the engaging section 5. In the present preferred embodiment, portions at which the refill 3 is prohibited from being turned are limited to only the engaging section 5. Consequently, it is possible to avoid positioning portions from being disposed around the support plate 34, thus achieving the compact refill 3 having the compact support plate 34.

Moreover, the engaging sections 5 are disposed between the base end 351 of the transfer head 35 and the first and second case members 1 and 2, respectively, thus producing the effect in securely supporting the refill 3.

In the preferred embodiment of the engaging sections 5, the recess 53*a* formed at the base end 351 of the transfer head 35 and the projections 51*a* and 52*a* formed at the first case member 1 and the second case member 2 can avoid any projection from being formed at a profile on the refill side, thus contributing to the compactness.

Additionally, the recess 53*a* and the projections 51*a* and 52*a* are formed into, for example, the cross shape that is a polygonal shape as viewed in cross section, thus securely prohibiting any turn.

On the other hand, it is desirable that the inner surfaces of the first case member 1 and the second case member 2 and the base end 351 should be brought into contact with each other. When the refill 3 is contained, the high engagement strength can be achieved between both of the case members, and further, deviation between the first case member 1 and the second case member 2 can be effectively prevented.

In the present preferred embodiment, since the engaging section 5 securely prohibits the rotation of the refill 3, even if the configuration in which the reel section 31 supports on only either side inside of the refill 3 is adopted, like the support plate 34, the support plate 34 can support on both sides together with the first case member, thus achieving the secure support. Furthermore, the formation of the compact support plate 34 contributes to the compactness of the refill 3. Similarly, the prohibition of the rotation of the refill 3 by the engaging section 5 favorably positions the reel section, so that the constituent elements of the transmission mechanism D can be separated on the first case member 1 side and the refill 3 side, and further, the driven gear 331*b* is formed integrally with the taking-up reel 33, thus achieving the favorable transmission of the drive force even with the reduced number of component parts. Additionally, the number of component parts responsible for the drive and the correlated portions of the component parts responsible for the rotation of the reel section 31 can be effectively reduced, thus achieving the stable traveling of the transfer tape T.

<Modifications>

A description will be given below of modifications of the present preferred embodiment. In the present modifications, the same constituent elements as those in the above-described preferred embodiment are designated by the same reference numerals, and therefore, the description will not be given below.

Figure 12:
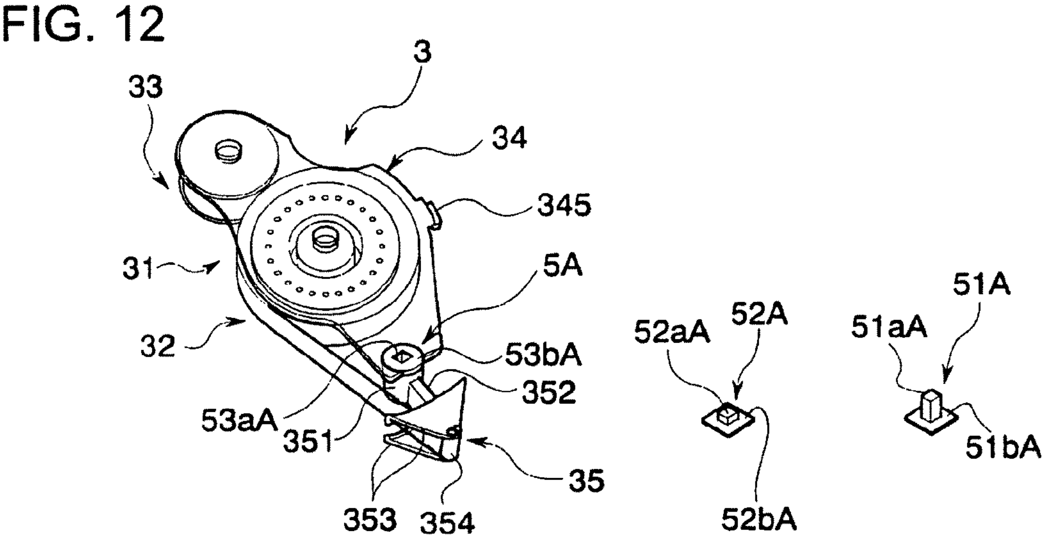
FIG. 12 is a view illustrating the configuration of a modification in the preferred embodiment.

As illustrated in FIG. 12, shapes other than that in the preferred embodiment also can favorably prohibit rotation.

Specifically, a engaging section 5A in the present modification includes a square hole 53A formed at a base end 351 of a transfer head 35, a first square rib 51A disposed in a first case member 1, not illustrated, and a second square rib 52A disposed in a second case member 2, not illustrated.

The first square rib 51A includes a projection 51*a*A which can be fitted into a recess 53*a*A formed at the square hole 53A and an abutment surface 51*b*A which is formed by raising the inner surface of the first case member 1, not illustrated, at the peripheral edge of the recess 53*a*A. The projection 51*a*A is formed into a square shape that is a polygonal shape as viewed in cross section, in the present preferred embodiment, to be fitted into the recess 53*a*A without any clearance. The abutment surface 51*b*A can abut against an end surface 53*b* of the square hole 53. The second square rib 52A includes a projection 52*a*A which can be fitted into the recess 53*a*A of the square hole 53A and an abutment surface 52*b*A which is formed by raising the inner surface of the second case member 2, not illustrated, at the peripheral edge of the projection 52*a*A. The cross hole 53A includes a recess 53*a*A engaging with the projections 51*a*A and 52*a*A at the inner surface thereof without any clearance and an end surface 53*b*A facing the inner surfaces of the first case member 1 and the second case member 2.

The engaging section 5A having the above-described configuration also can effectively prohibit the rotation of a refill 3.

Figure 13:
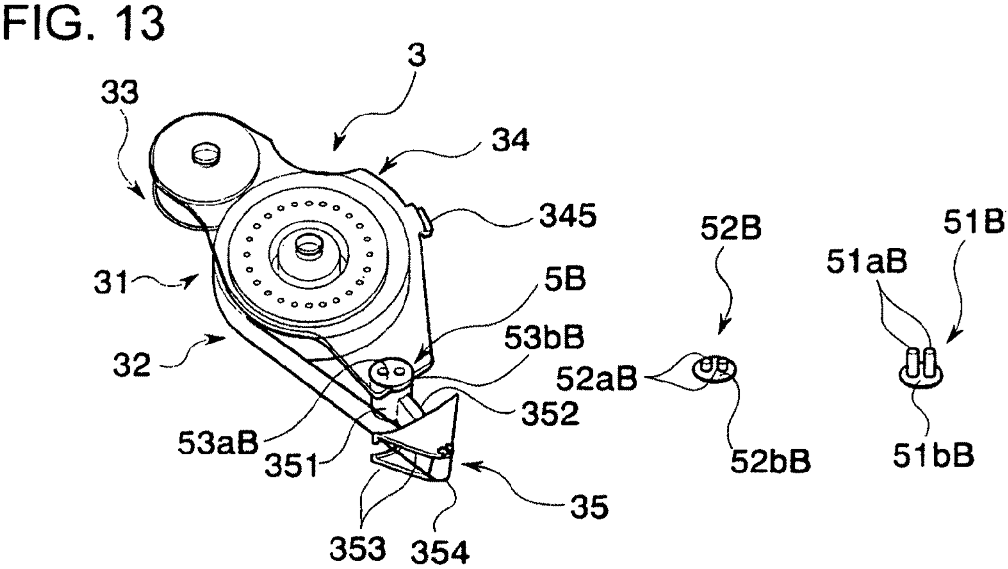
FIG. 13 is a view illustrating the configuration of another modification in the preferred embodiment.

As illustrated in FIG. 13, a engaging section 5B capable of prohibiting rotation may have a configuration using a shape other than the polygonal shape. Otherwise, the engaging section 5B may include a plurality of constituent elements disposed in a first case member 1 and a second case member 2 with respect to a base end 351 of a single transfer head 35 on a refill side.

Specifically, the engaging section 5B in the present modification may include a two-hole portion 53B which is formed at the base end 351 of the transfer head 35 and has two recesses 53*a*B and 53*a*B, a first columnar rib 51B having two projections 51*a*B formed at a first case member 1, not illustrated, and a second columnar rib 52B having two projections 52*a*B formed at a second case member 2, not illustrated. Of course, also in the present modification, abutment surfaces 51*b*B and 52*b*B can abut against an end surface 53*b*B.

Like the engaging section 5B, the polygonal cross-sectional shape may not be used. In addition, the two projections 51*a*B or the two projections 52*a*B at the first case member 1 or the second case member 2 may be fitted into the two holed recesses 53*a*B formed at the base end 351 of the transfer head 35, like the engaging section 5B.

Although the preferred embodiment according to the present invention has been described above, the specific configuration of each of the constituent elements is not limited only to the preferred embodiment, and therefore, may be variously modified and altered without departing from the spirit of the present invention.

For example, the engaging section may include a recess formed on a case member side and a projection formed from a refill side. Alternatively, the cross-sectional shape of the engaging section capable of prohibiting the rotation of the support plate is not limited to those in the preferred embodiment and the modifications, and therefore, may select from various other shapes capable of prohibiting a relative rotation. Of course, the recess and the projection are not always completely fitted to each other. For example, a projection may have a cross-sectional shape different from that of the recess as long as it can prohibit the rotation.

Besides, the specific configuration of each of the constituent elements is not limited only to the preferred embodiment, and therefore, may be variously modified and altered without departing from the spirit of the present invention.

INDUSTRIAL APPLICABILITY

Good use of the present invention can effectively avoid the trouble of the relative movement between the reel section and the case member, thus effectively reducing the number of other positioning portions of both of the case members and the refill in the engaging section. As a consequence, it is possible to avoid the positioning portions from being formed around the support plate, so as to achieve the compact refill having the smaller support plate.

The invention claimed is:

1. A transfer tool, comprising a refill interposed between a first case member and a second case member, wherein the refill comprises:

a reel section for holding a transfer tape therein;

a transfer head capable of transferring a transferring material attached to the transfer tape onto a transfer target; and a support plate comprising the reel section fixed thereto and being integrated with a base end of the transfer head, wherein the transfer tool further comprises an engaging section configured to prevent a relative rotation about the engaging section between the base end and the first case member and the second case member in a direction opposite to a point where the transfer head engages the transfer target when transferring the transferring material onto the transfer target, the engaging section being provided between the base end and the reel section on the support plate and being provided between the first case member and the second case member, and wherein the engaging section is only provided between the base end and the reel section.

2. The transfer tool according to claim 1, wherein the engaging section is disposed between the base end of the transfer head and each of the first and second case members.

3. The transfer tool according to claim 1, wherein the engaging section includes a recess formed at either one of the base end of the transfer head and the first case member and the second case member and a projection formed at the other.

4. The transfer tool according to claim 3, wherein each of the recess and the projection is formed into a polygonal shape, as viewed in cross section.

5. The transfer tool according to claim 1, wherein an inner surface of each of the first case member and the second case member abuts against the base end.

6. The transfer tool according to claim 1, wherein the reel section includes a supply reel capable of supplying the transfer tape and a taking-up reel capable of taking up the transfer tape, and wherein either one of the first and second case members supports one end of the reel section and the support plate supports the other end of the reel section.

7. The transfer tool according to claim 1, wherein the reel section includes the supply reel capable of supplying the transfer tape and the taking-up reel capable of taking up the transfer tape, and further, either one of the first and second case members includes a drive gear rotatable with the supply reel, and wherein the taking-up reel comprises a driven gear, which can mesh with the drive gear, formed thereon.

8. The transfer tool according to claim 2, wherein the engaging section includes a recess formed at either one of the base end of the transfer head and the case member and a projection formed at the other.

9. The transfer tool according to claim 2, wherein an inner surface of each of the first case member and the second case member abuts against the base end.

10. The transfer tool according to claim 3, wherein an inner surface of each of the first case member and the second case member abuts against the base end.

11. The transfer tool according to claim 4, wherein an inner surface of each of the first case member and the second case member abuts against the base end.

12. The transfer tool according to claim 2, wherein the reel section includes a supply reel capable of supplying the transfer tape and a taking-up reel capable of taking up the transfer tape, and wherein either one of the first and second case members supports one end of the reel section and the support plate supports the other end of the reel section.

13. The transfer tool according to claim 3, wherein the reel section includes a supply reel capable of supplying the transfer tape and a taking-up reel capable of taking up the transfer tape, and wherein either one of the first and second case members supports one end of the reel section and the support plate supports the other end of the reel section.

14. The transfer tool according to claim 4, wherein the reel section includes a supply reel capable of supplying the transfer tape and a taking-up reel capable of taking up the transfer tape, and wherein either one of the first and second case members supports one end of the reel section and the support plate supports the other end of the reel section.

15. The transfer tool according to claim 5, wherein the reel section includes a supply reel capable of supplying the transfer tape and a taking-up reel capable of taking up the transfer tape, and wherein either one of the first and second case members supports one end of the reel section and the support plate supports the other end of the reel section.

16. The transfer tool according to claim 2, wherein the reel section includes the supply reel capable of supplying the transfer tape and the taking-up reel capable of taking up the transfer tape, and further, either one of the first and second case members includes a drive gear rotatable with the supply reel, and wherein the taking-up reel comprises a driven gear, which can mesh with the drive gear, formed thereon.

17. The transfer tool according to claim 3, wherein the reel section includes the supply reel capable of supplying the transfer tape and the taking-up reel capable of taking up the transfer tape, and further, either one of the first and second case members includes a drive gear rotatable with the supply reel, and wherein the taking-up reel comprises a driven gear, which can mesh with the drive gear, formed thereon.

18. The transfer tool according to claim 4, wherein the reel section includes the supply reel capable of supplying the transfer tape and the taking-up reel capable of taking up the transfer tape, and further, either one of the first and second case members includes a drive gear rotatable with the supply reel, and wherein the taking-up reel comprises a driven gear, which can mesh with the drive gear, formed thereon.

19. The transfer tool according to claim 5, wherein the reel section includes the supply reel capable of supplying the transfer tape and the taking-up reel capable of taking up the transfer tape, and further, either one of the first and second case members includes a drive gear rotatable with the supply reel, and wherein the taking-up reel comprises a driven gear, which can mesh with the drive gear, formed thereon.

20. The transfer tool according to claim 6, wherein the reel section includes the supply reel capable of supplying the transfer tape and the taking-up reel capable of taking up the transfer tape, and further, either one of the first and second case members includes a drive gear rotatable with the supply reel, and wherein the taking-up reel comprises a driven gear, which can mesh with the drive gear, formed thereon.

21. A transfer tool, comprising:

a first case member;

a second case member;

a refill formed between the first case member and the second case member, the refill comprising:

a reel section for holding a transfer tape therein;

a transfer head capable of transferring a transferring material attached to the transfer tape onto a transfer target; and a support plate to secure the reel section and being integrated with a base end of the transfer head, and an engaging section configured to prevent a relative rotation about the engaging section between the base end and the first case member and the second case member in a direction opposite to a point where the transfer head engages the transfer target when transferring the transferring material onto the transfer target, the engaging section comprising a first portion provided at the base end on the support plate and being provided between the first case member and the second case member, and a second portion being provided opposite the first portion on respective inside walls of the first case member and the second case member configured to engage the first portion, wherein the engaging section is only provided between the base end and the reel section.

22. A transfer tool, comprising a refill interposed between a first case member and a second case member, wherein the refill comprises:

a reel section for holding a transfer tape therein;

a transfer head capable of transferring a transferring material attached to the transfer tape onto a transfer target; and a support plate comprising the reel section fixed thereto and being integrated with a base end of the transfer head, wherein the transfer tool further comprises an engaging section configured to prevent a relative rotation about the engaging section between the base end and the first case member and the second case member in a direction opposite to a point where the transfer head engages the transfer target when transferring the transferring material onto the transfer target, the engaging section being provided between the base end and the reel section on the support plate and being provided between the first case member and the second case member, wherein the engaging section is disposed between the base end of the transfer head and each of the first and second case members, wherein an inner surface of each of the first case member and the second case member abuts against the base end, wherein, when the first case member and the second case member are engaged, the refill is configured to be positioned in a thickness direction, and wherein the engaging section is only provided between the base end and the reel section.

23. The transfer tool according to claim 1, wherein the engaging section includes a recess formed at the base end of the transfer head, and wherein the first case member and the second case member comprise a first projection and a second projection, respectively, the first and second projections to be received in the recess when the first case member and the second case member are engaged together with the refill interposed therebetween.

24. The transfer tool according to claim 23, wherein the first projection and the second projection comprise a cross shape, and wherein the recess comprises a cross shape to receive the first and second projections therein without any clearance.

25. A transfer tool, comprising a refill interposed between a first case member and a second case member, wherein the refill comprises:

a reel section for holding a transfer tape therein;

a transfer head capable of transferring a transferring material attached to the transfer tape onto a transfer target; and a support plate comprising the reel section fixed thereto and being integrated with a base end of the transfer head, wherein the transfer tool further comprises an engaging section configured to prevent a relative rotation about the engaging section between the base end and the first case member and the second case member in a direction opposite to a point where the transfer head engages the transfer target when transferring the transferring material onto the transfer target, the engaging section being provided between the base end and the reel section on the support plate and being provided between the first case member and the second case member, wherein the engaging section is only provided between the base end and the reel section, and wherein said transfer head comprises:

said base end of the transfer head, said base end of the transfer head being formed integrally with the support plate and said engaging section;

an extension section, a first end of the extension section being provided at the base end;

restrictions formed at a second end of the extension section; and a roller rotatably supported by the restrictions, said roller being configured to rotate as the transfer head transfers said transferring material onto the transfer target.

* * * * *